US012579587B2

(12) United States Patent
Fan et al.

(10) Patent No.: US 12,579,587 B2
(45) Date of Patent: Mar. 17, 2026

(54) SYSTEM AND METHOD FOR SUPPORTING EXECUTION OF BATCH PRODUCTION USING REINFORCEMENT LEARNING

(71) Applicant: Siemens Corporation, Washington, DE (US)

(72) Inventors: Ting-Han Fan, Princeton, NJ (US); Yubo Wang, Princeton, NJ (US); Ulrich Muenz, Princeton, NJ (US); Mathias Hakenberg, Plainsboro, NJ (US)

(73) Assignee: Siemens Corporation, Washington, DC (US)

( * ) Notice: Subject to any disclaimer, the term of this patent is extended or adjusted under 35 U.S.C. 154(b) by 79 days.

(21) Appl. No.: 18/685,751

(22) PCT Filed: Aug. 26, 2022

(86) PCT No.: PCT/US2022/041711
§ 371 (c)(1),
(2) Date: Feb. 22, 2024

(87) PCT Pub. No.: WO2023/043601
PCT Pub. Date: Mar. 23, 2023

(65) Prior Publication Data
US 2025/0124527 A1 Apr. 17, 2025

Related U.S. Application Data

(60) Provisional application No. 63/244,889, filed on Sep. 16, 2021.

(51) Int. Cl.
*G06Q 50/04* (2012.01)
*G06Q 10/0875* (2023.01)

(52) U.S. Cl.
CPC ......... *G06Q 50/04* (2013.01); *G06Q 10/0875* (2013.01)

(58) Field of Classification Search
CPC .... G06Q 50/04; G06Q 10/0875; G06Q 10/04; G06Q 10/06316
See application file for complete search history.

(56) References Cited

U.S. PATENT DOCUMENTS

| | | | | |
|---|---|---|---|---|
| 7,403,904 B2 * | 7/2008 | Abe | ................... | G06Q 30/0234 |
| | | | | 706/14 |
| 11,157,840 B2 * | 10/2021 | Pfaffinger | ............ | G06Q 10/043 |

(Continued)

FOREIGN PATENT DOCUMENTS

| | | | | |
|---|---|---|---|---|
| EP | 1403748 B1 * | 10/2007 | ......... | G06Q 10/0631 |
| JP | 4737735 B2 * | 8/2011 | ......... | G06Q 10/0631 |

(Continued)

OTHER PUBLICATIONS

JP-4737735-B2 patent translation (Year: 2001).*

(Continued)

*Primary Examiner* — Michael Jared Walker

(57) ABSTRACT

A computer-implemented method for supporting execution of batch production by a production system includes, over a sequence of steps: acquiring a system state defined by a shop floor status, inventory status and a demand of the product types, and processing the system state using a reinforcement learned policy including a deep learning model to output a control action defining an integer batch size of a selected product type. The control action is determined by using learned parameters of the deep learning model to compute logits for a categorical distribution of predicted product types and a categorical distribution of predicted batch sizes from the system state. The logits are processed to transform the categorical distribution of predicted product types into an encoding of the selected product type and reduce the (Continued)

100

Production System

102 Shop Floor
104 Inventory Management System
106 Product Demand Forecaster 114 124 116

108 Production Execution Interface Module

118

120 122

110 Batch Size Optimization Module

112 RL Policy categorical distribution of predicted batch sizes into an integer batch size, for producing a next batch on the shop floor.

10 Claims, 5 Drawing Sheets

(56) References Cited

U.S. PATENT DOCUMENTS

| 11,568,101 | B2 * | 1/2023 | Halle | G06F 30/20 |
| 11,715,052 | B2 * | 8/2023 | Yesudas | G06N 5/04 |
| | | | | 705/7.25 |
| 11,797,856 | B1 * | 10/2023 | Oezer | G06N 3/092 |
| 11,966,840 | B2 * | 4/2024 | Ahn | G06N 7/01 |
| 2019/0213508 | A1 * | 7/2019 | Pfaffinger | G06Q 10/04 |
| 2020/0394441 | A1 * | 12/2020 | Wen | G06N 3/045 |
| 2021/0278825 | A1 * | 9/2021 | Wen | G05B 19/41865 |
| 2022/0383100 | A1 * | 12/2022 | Zhu | G06N 3/045 |

FOREIGN PATENT DOCUMENTS

| WO | WO-2020165238 | A1 * | 8/2020 | G06Q 10/06 |
| WO | 2021052588 | A1 | 3/2021 | |

OTHER PUBLICATIONS

Wikipedia, Klassische Losformel, pp. 1-11, https://de.wikipedia.org/wiki/Klassische_Losformel, XP093000477.
Tuomas Haarnoja et al. "Soft Actor-Critic: Off-Policy Maximum Entropy Deep Reinforcement Learning with a Stochastic Actor"; Aug. 8, 2018.
Eric Jan et al. "Categorical Reparameterization With Gumbel-Softmax"; Published as a conference paper at ICLR 2017.

* cited by examiner

Computing System 500

Machine-Readable Medium 520

Production Execution Interface Instructions 522

Batch Size Optimization Instructions 524

Processor(s) 510

SYSTEM AND METHOD FOR SUPPORTING EXECUTION OF BATCH PRODUCTION USING REINFORCEMENT LEARNING

TECHNICAL FIELD

The present disclosure relates, in general, to batch production, and in particular, to systems, methods and computer program products for supporting execution of batch production by a production system using reinforcement learning.

BACKGROUND

Batch production is a method of manufacturing where products are made in groups, called batches, within a time frame. A batch can pass through a series of stages in a manufacturing process, meaning that another batch cannot begin a stage if the previous batch is still within that stage of the manufacturing process. A large-scale production system may be capable of producing several different types of products on the shop floor. A key aspect in the execution of large-scale production involves determining when a particular product is to be produced and in what quantity (batch size) for optimum utilization of the shop floor and inventory as a function of product demand.

SUMMARY

Briefly, aspects of the present disclosure provide a technique for batch size optimization for large-scale batch production using reinforcement learning, that can address at least the technical problems mentioned above.

A first aspect of the disclosure provides a computer-implemented method for supporting execution of batch production by a production system configured to produce a number of different product types on a shop floor. The method comprises acquiring a system state defined by a shop floor status, inventory status and a product demand of the product types. The method further comprises processing the system state using a reinforcement learned policy comprising a deep learning model to output a control action defining an integer batch size of a selected product type. The control action is determined by: using learned parameters of the deep learning model to compute logits for a categorical distribution of predicted product types and a categorical distribution of predicted batch sizes from the system state; and processing the logits to transform the categorical distribution of predicted product types into an encoding of the selected product type and reduce the categorical distribution of predicted batch sizes into an integer batch size. The method further comprises communicating the control action to the production system to effect production of a next batch on the shop floor based on the integer batch size of the selected product type. The method is iteratively executed over a sequence of steps to support execution of batch production by the production system.

A second aspect of the disclosure provides a computer-implemented method for training a policy for supporting execution of batch production by a production system using reinforcement learning in a simulated environment, the production system configured to produce a number of different product types on a shop floor. The method is iteratively executed over a sequence of steps. At each step, the method comprises reading a system state from the simulation environment, the system state defined by a shop floor status, inventory status and a product demand of the product types. The method further comprises processing the system state using the policy to output a control action defining an integer batch size of a selected product type, whereby the system state is updated based on the control action at each step. The policy comprises a deep learning model. The control action is determined by: using learnable parameters of the deep learning model to compute logits for a categorical distribution of predicted product types and a categorical distribution of predicted batch sizes from the system state; creating respective discretized vector representations of the predicted product types and the predicted batch sizes based on the respective logits using a straight-through estimator, wherein the discretized vector representation of the predicted product types defines an encoding of the selected product type; and reducing the discretized vector representation of the predicted batch sizes to an integer batch size using a linear transformation. The method further comprises updating the learnable parameters by computing a policy loss based on the control action, the policy loss being dependent on evaluation of a reward function defined based on a total production cost.

Other aspects of the disclosure implement features of the above-described methods in computing systems and computer program products for supporting execution of batch production by a production system.

Additional technical features and benefits may be realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The foregoing and other aspects of the present disclosure are best understood from the following detailed description when read in connection with the accompanying drawings. To easily identify the discussion of any element or act, the most significant digit or digits in a reference number refer to the figure number in which the element or act is first introduced.

DETAILED DESCRIPTION

Figure 1:
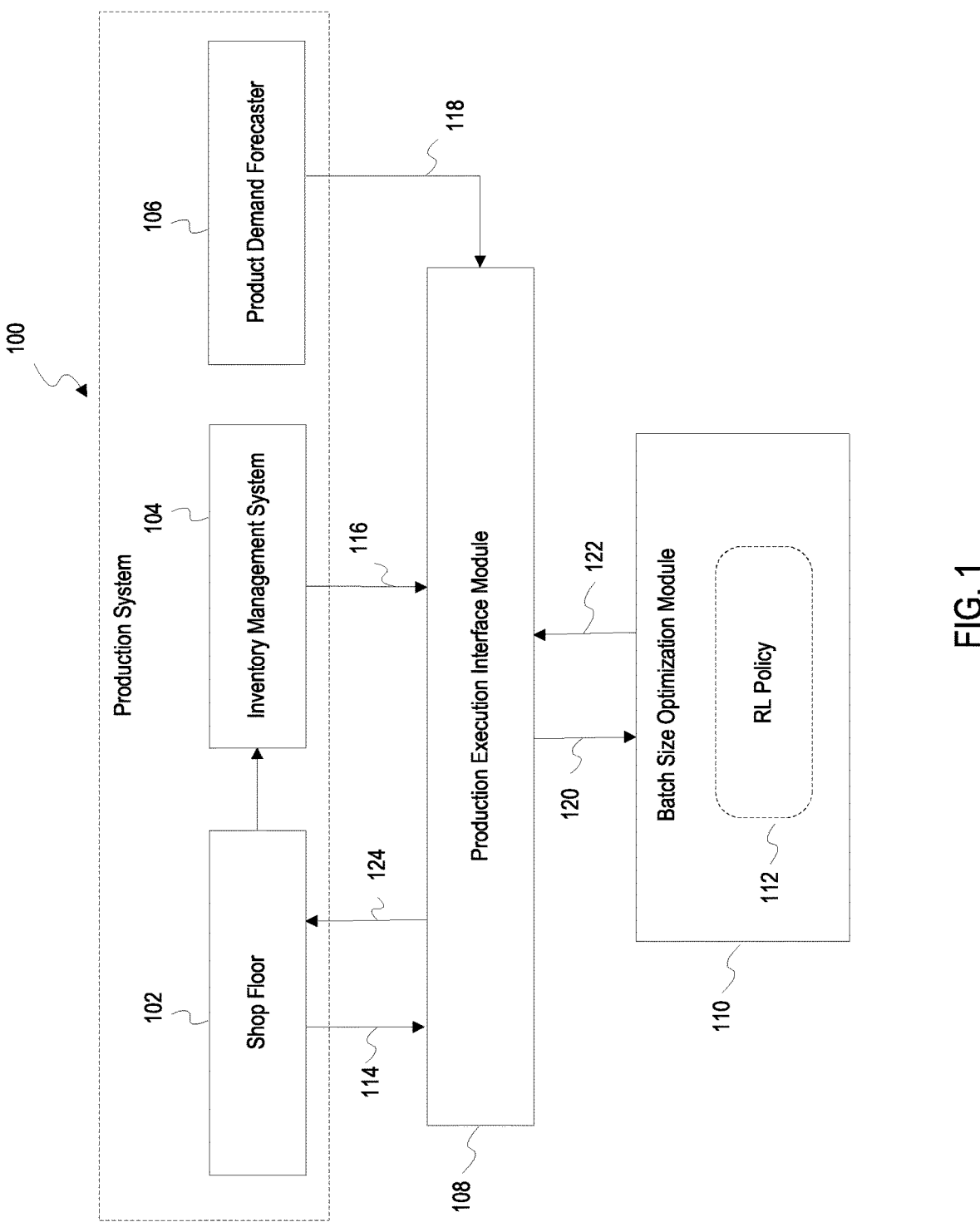
FIG. 1 is a schematic block diagram of a system for supporting execution of batch production according to an example embodiment.

Many manufacturing processes implement a batch-wise production. An example use case of batch-wise production is in make-to-stock manufacturing, in which production planning and scheduling are based on an anticipated product demand.

In batch production, a common shop floor may be utilized to produce a number of different types of products with different manufacturing recipes (raw materials, process steps, etc.). A manufacturing planning system may be used to determine which types of products are to be produced and in what quantity (batch size) utilizing the shop floor at a given time, based on the manufacturing recipes of the products and the anticipated product demands. The decision may be based on solving an optimization problem to minimize overall production cost (or maximizing profits) for the produced goods, subject to the available production resources, inventory and layout of the shop floor. The cost may depend on the raw material costs for the different products, the cost of the secondary production resources e.g. energy, labor, etc., and the obsolescence of products on the shelf before they can be sold to a customer.

Often, the decision variables for the above-described optimization problem are integer batch sizes of respective product types, which can make the modeling and optimization for the decisions highly nontrivial. Hence, the problem of batch size optimization may be hard to scale to production systems that can be used to produce a large number of different products.

In the manufacturing industry, simple heuristics are widely used to decide the next production batches. Such heuristics may include min/max-inventory thresholds or calendar-based triggers or a combination of both. Commercial software solutions for production planning are available that are based on such heuristics.

Another approach to determine the next production batches is to formulate the above-mentioned optimization problem, for example, as a Mixed-Integer Linear Program or derive optimal policies from a model of the production system. Such optimization approaches may require a detailed model of the production system and are therefore unlikely to be available as an off the shelf product, but usually require a customization to the specific production system.

The disclosed methodology attempts to solve the above-described problem of batch size optimization by leveraging a policy trained using reinforcement learning (RL). An RL system involves an interaction between the policy and the environment (i.e., the production system). After receiving an action, the environment may output an observation that automatically satisfies the production systems' constraints. While the RL formulation can naturally satisfy the constraints of the production system, the integer constraints of the batch size of the respective product types remain challenging.

Recent breakthroughs in RL have shown promising results in applications involving continuous control, such as in gaming, robotics, autonomous driving, among others. However, in industrial systems, such as in a batch production system, the decision variables for batch size are often represented by integers. Because integer variables are not readily differentiable, they can raise an issue with certain types of RL policies that are based on computing gradients over control actions, such as policies based on deep deterministic policy gradient (DDPG) or soft actor-critic (SAC) methods. While alternative methods exist that can obviate the integer action problem, most notably methods using REINFORCE estimators, they tend to have high variance, which can make them unsuitable for large-scale production systems.

According to the disclosed methodology, the above problem can be addressed by leveraging reparameterization methods for discrete random variables (e.g., Gumbel-Softmax estimators), and combining them with straight-through estimators that can represent a discrete random variable in the forward pass (of a neural network) and maintain differentiability in the backward pass. Since integer variables admit a discrete structure, such a reparameterization technique using straight-through estimators can be adopted for the above-described integer batch size constraint in the batch size optimization problem.

Furthermore, the disclosed methodology leverages a key insight that integer variables are fundamentally different from discrete or "categorical" variables. In general, integer variables are comparable while discrete variables are not. For example, the elements in the integer set $\{1, 2, 3\}$ are comparable because $1<2<3$, while the discrete set $\{$dog, cat, frog$\}$ cannot assign such a relationship. Typically, a one-hot encoding is employed for representing a discrete sample due to its incomparability. An integer set has comparability, because of which an integer sample can be represented by an integer quantity instead of a one-hot vector. In light of this fact, the disclosed methodology employs a linear mapping from a discretized vector representation (e.g., a one-hot encoding) of categorical predicted batch sizes, created using the straight-through estimator, to an integer batch size.

The mapped integer action derived using the straight-through estimator can be random and differentiable with respect to learnable parameters of the policy. Furthermore, with the integer mapping, the effective dimension of the action space for a given product type can be essentially equal to one and independent of the fineness of discretization. With the differentiability and the effective dimension of the action space, the disclosed methodology may be readily compatible with continuous action-based RL methods such as DDPG and SAC, which have low variances and are hence scalable to large-scale production systems.

Turning now to the drawings, FIG. 1 illustrates a system for supporting execution of batch production according to an example embodiment. The various modules described herein, including the production execution interface module 108 and the batch size optimization module 110, including components thereof, may be implemented by a computing system in various ways, for example, as hardware and programming. The programming for the modules 108, 110 may take the form of processor-executable instructions stored on non-transitory machine-readable storage mediums and the hardware for the modules may include processors to execute those instructions. The processing capability of the systems, devices, and modules described herein, including the production execution interface module 108 and the batch size optimization module 110 may be distributed among multiple system components, such as among multiple processors and memories, optionally including multiple distributed processing systems or cloud/network elements.

The production system 100 may include a shop floor 102 that can comprise a number of production machines for executing various tasks or stages of manufacturing. The shop floor 102 may be utilized to manufacture different types of products, where each product type may be characterized by a unique manufacturing recipe. The manufacturing recipe of a product may be defined by the type and quantity raw materials, which can include parts and sub-assemblies (e.g., based on a bill of materials), and/or by the manufacturing process, which can include the sequence of tasks, production machinery, line configurations, tools etc. (e.g., based on a bill of process). At least some of the production machines of the shop floor 102 can be usable in the manufacturing processes of multiple product types and may be hence operated based on a planning and scheduling mechanism.

The production system 100 may also include a storage facility for maintaining an inventory of finished products as well as raw materials. The inventory may hold products and materials until they are sold (e.g., to a retailer) or until a predefined inventory shelf-life is reached. Obsolescence of products and material represent a production cost due to wastage of products and material. The production system 100 may include an inventory management system 104, which may comprise a computerized system for tracking inventory levels, orders, sales, deliverables, etc.

According to disclosed embodiments, the production system 100 may be operated in make-to-stock manufacturing process based on an anticipated or forecasted product demand. That is, products made during one production period may be used to fulfill orders made in a next production period. In this approach, production panning may start with the supplies (e.g., raw materials, secondary resources) and work forward to the finished products. To that end, the production system 100 may use a product demand forecaster 106 (typically, a software tool), which may use historical data or other analytical information to produce predictions on product demand for a specific period. Based on the forecasted product demand, the disclosed methodology may be used to balance production capacity that meets the demand, minimizing the costs associated with high inventory (e.g., inventory management, warehousing, obsolescence,) and low inventory (e.g., missed delivery times).

In an alternate embodiment, the production system 100 may be operated in a make-to-order manufacturing process, where products may be manufactured only after a confirmed order for the products is received. In this case, the anticipated product demand may be replaced by an actual product demand based on confirmed orders.

The production execution interface module 108 may interact with the production system 100 to support execution of batch production by the production system 100. In embodiments, the production execution interface module 108 may be part of a manufacturing execution system (MES) or a manufacturing IT system that may be used to track and document the transformation of raw materials into finished products. According to disclosed embodiments, the production execution interface module 108 may periodically acquire shop floor status information 114 from the shop floor 102, inventory status information 116 from the inventory management system 104 and an anticipated product demand 118 of each product type from the product demand forecaster 106. The shop floor status information 114 may define a utilization of resources (e.g., production machines) on the shop floor 102 by one or more current batches in production, which can be indicative of a remaining production time of the one or more current batches in production. The inventory status information 116 may include information such as the current utilization of the storage facility, the products in the inventory, remaining shelf-life of products in the inventory, etc. The anticipated product demand 118 may include, for each product type, a demand measure defined by a quantity and/or total selling price of the product type for a defined period into the future. As mentioned above, for a make-to-order manufacturing process, the anticipated product demand may be replaced by an actual product demand for a specified period. The acquired shop floor status information 114, inventory status information 116 and anticipated product demand 118 (or actual product demand) may be used to define a system state of the production system 100 at a given step, which may be communicated to the batch size optimization module 110.

The batch size optimization module 110 may process the system state 120 using a RL policy 112 comprising a deep learning model to output a control action 122 that includes an integer batch size of a selected product type. The control action 122 may be communicated to the production system 100 by the production execution interface module 108 as an output 124 (e.g., as control signals for production machines or visual output for an operator) to effect production of a next batch on the shop floor 102 based on the integer batch size of the selected product type. The method may be iteratively executed over a sequence of steps to support execution of batch production by the production system 100, where the system state 120 of the production system 100 may be updated based on the control action 122 at each step.

Figure 2:
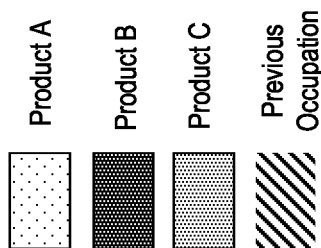
FIG. 2 is a graphical illustration of shop floor resource utilization based on batch production.
Figure 2:
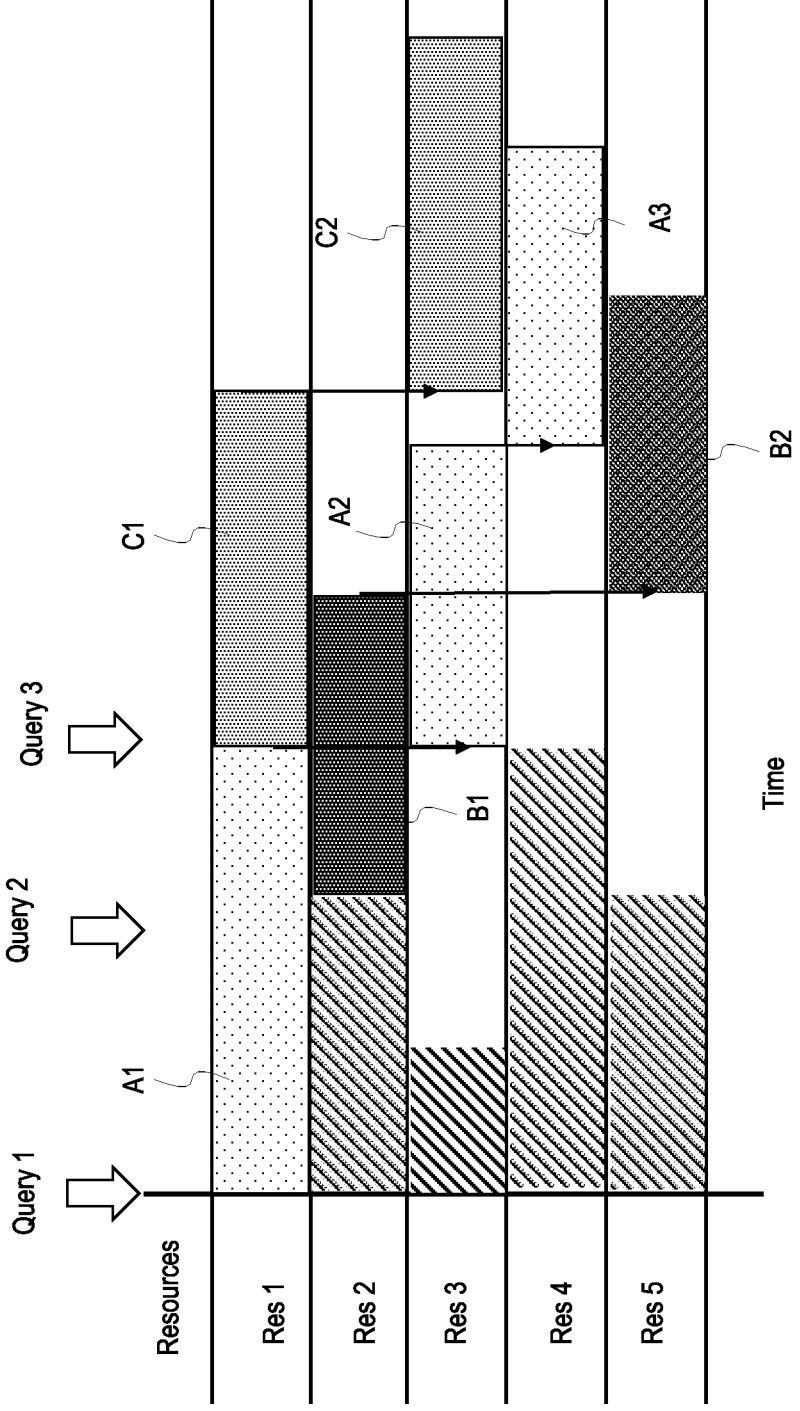

FIG. 2 shows an example of shop floor resource utilization based on batch production. Here, the x-axis represents time, and the y-axis represents resources (e.g., production machines) on the shop floor. While only 3 different product types (namely, product A, product B and product C) are shown here for illustrative purposes, the shop floor of a large-scale production system may typically be utilized for production of a large number of different product types. The manufacturing recipe of each product type can include a sequence of tasks, where each task may be carried out using a particular resource. In the shown illustration: the manufacturing recipe of product A includes a sequence of tasks A1, A2 and A3 that use resources Res 1, Res 3 and Res 4 respectively; the manufacturing recipe of product B includes a sequence of tasks B1 and B2 that use resources Res 2 and Res 5 respectively; and the manufacturing recipe for product C includes a sequence of tasks C1 and C2 that use resources Res 1 and Res 3 respectively. The sequence of tasks is indicated by vertical arrows connecting the tasks.

By executing the RL policy 112 in a sequence of steps, a sequence of batches of different product types with corresponding bath sizes may be determined dependent of the system state at each step. For example, in a first step (query 1), based on the current utilization of resources, inventory status and product demand, the RL policy 112 may output product A with a specified batch size, as shown. The current utilization of resources may indicate a remaining production time for the current batch utilizing a particular resource. The system state may then be updated to reflect the resource utilization by product A over time. Likewise, in the next steps (query 2 and query 3) the RL policy 112 may respectively output product B and product C with specified batch sizes, based on the current utilization of resources, inventory status and product demand, with the system state being successively updated based on the output of the R policy 112 at each step.

The policy 112 may be trained via a process of reinforcement learning. The process can include, over a sequence of steps of trial, optimizing learnable parameters (e.g., weights) of the deep learning model of the policy 112 to maximize a cumulative reward resulting from a sequence of control actions, based on a reward function r defined based on a total production cost. For a make-to-stock manufacturing process, the total production cost may depend on the cost of raw materials, cost of secondary production resources and cost of obsolescence of products in the inventory. The reward function r may depend on a current system state $s_t$, the action $a_t$ taken in the current step and the next system state $s_{t+1}$.

In one embodiment, the reward function r may be defined by:

$$r = -(c_{raw} + c_{sec} + c_{obs}) \tag{1}$$

In equation (1), $c_{raw}$ represents a cost of raw materials, $c_{sec}$ represents a cost of secondary production resources (e.g., energy, labor, etc.) and $c_{obs}$ represents a cost associated with obsolesce of products in the inventory.

In another embodiment, the reward function r may be defined by:

$$r = c_{sales} - (c_{raw} + c_{sec} + c_{obs}) \qquad (2)$$

In equation (2), $c_{sales}$ represents an expected revenue from sale of the manufactured products. The reward function defined by equation (2) may be used to encourage manufacturing higher volumes of product types that have a higher margin of profit, if a demand is anticipated for such product types.

For a make-to-order manufacturing process, since products are not manufactured until a confirmed order for the products is received, a cost of obsolescence need not be considered, and the term $c_{obs}$ may be omitted from equations (1) and (2).

According to disclosed embodiments, the batch size optimization problem may be cast as an infinite-horizon Markov Decision Process (MDP), with the objective of the RL being to determine an optimal policy $\pi$ that maximizes a cumulative reward or "return", as given by:

$$\max_{\pi} J(\pi) = \max_{\pi} E\left[\sum_{t=0}^{\infty} \gamma^t r (s_t, a_t,)\right] \qquad (3)$$

In equation (3), E denotes an expectation, t denotes a step, $\gamma$ denotes a discount factor, where $\gamma \in (0,1)$, and r denotes the reward function, for example, as defined by equation (1) or (2).

The policy $\pi$ may be parameterized by learnable parameters $\theta$, as $\pi_{\theta}$. A typical way to optimize equation (3) by tuning over $\theta$ may involve using a policy gradient which may depend on the Q function under $\pi_{\theta}$, which may be defined as:

$$Q^{\pi_{\theta}}(s, a) = E\left[\sum_{t=0}^{\infty} \gamma^t r (s_t, a_t,) \Big| s_0 = s, a_0 = a, a_t \sim \pi_{\theta}(.\,|\,s_t)\right] \qquad (4)$$

In equation (4), $Q^{\pi_{\theta}}(s,a)$ denotes a Q function (also referred to as action-value function), which gives the expected return if a controller starts at system state s, takes an arbitrary action a, and then forever acts according to the policy $\pi_{\theta}$.

In some embodiments with entropy-regularized RL, such as in a soft actor-critic method, an agent may be assigned a bonus reward at each step t proportional to the entropy of the policy $\pi_{\theta}$ at that step t. In these embodiments, the entropy bonus may be summed up with the production cost-based reward function r, as defined in equations (1) and (2). Correspondingly, the Q function $Q^{\pi_{\theta}}(s,a)$ in equation (4) may also be changed to include entropy bonuses from every step except the first.

With $Q^{\pi_{\theta}}$ defined as described above, the policy gradient may be computed using:

$$\nabla_{\theta} J(\pi_{\theta}) = E_{s \sim \rho^{\pi}, a \sim \pi_{\theta}}[(\nabla_{\theta} \ln \pi_{\theta}(a\,|\,s))Q^{\pi_{\theta}}(s, a)] \qquad (5)$$

In equation (5), $p^{\pi}$ denotes an unnormalized discounted state distribution.

Since the expectation of equation (5) may not be easily computable, gradient estimation may become an important problem. Especially, since integer variables of the actions indicating batch size in a manufacturing process are not readily differentiable, they can raise an issue in computing a policy gradient for tuning the learnable parameters $\theta$ of the policy $\pi_{\theta}$. The above-described challenge may be addressed by the disclosed methodology of integer reparameterization.

Figure 3:
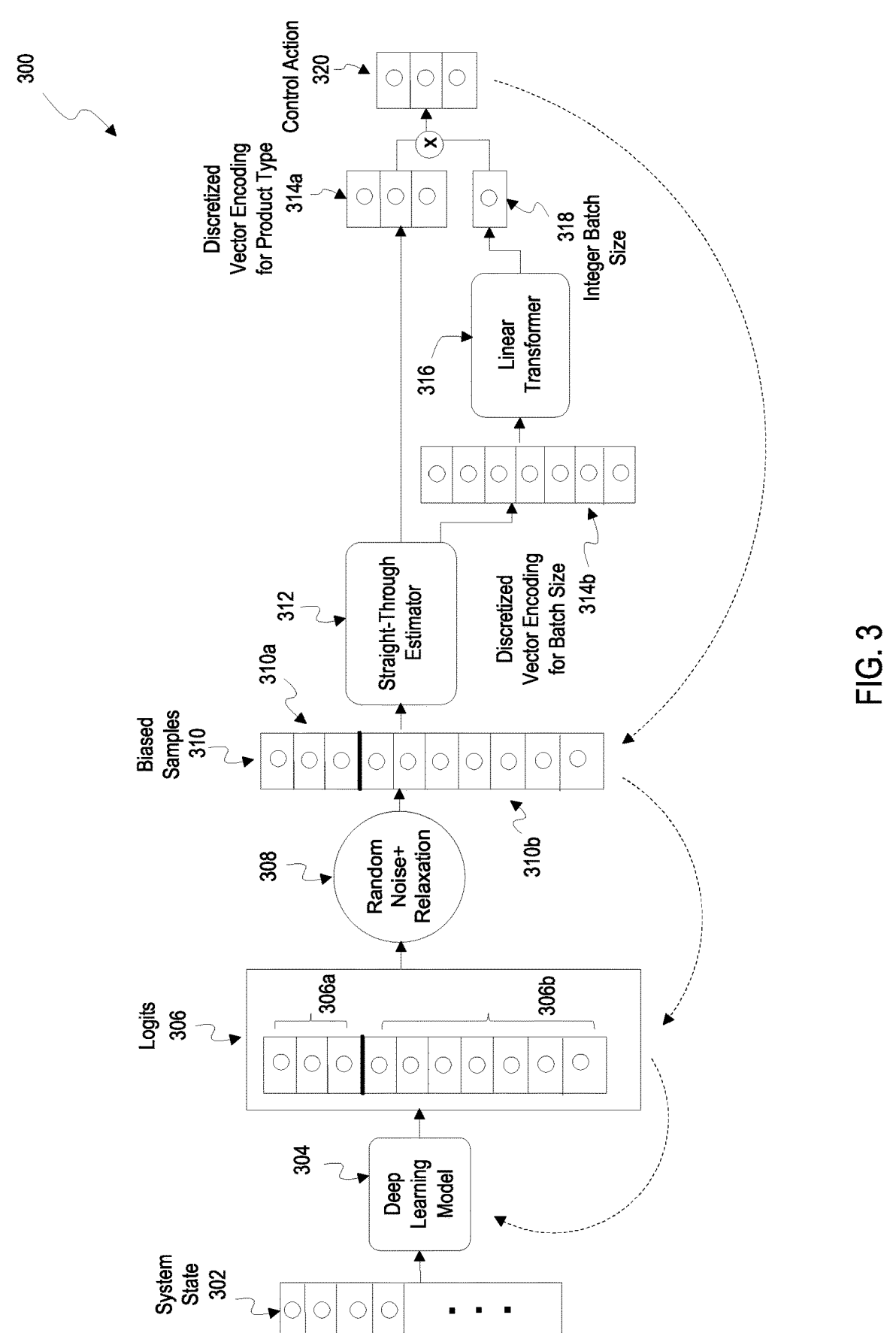
FIG. 3 is a schematic illustration of a RL policy for computing an integer batch size, according to an example embodiment.

FIG. 3 schematically illustrates a policy 300 according to an example embodiment. As shown, the policy 300 may include a deep learning model 304, typically including a neural network. The deep learning model 304 may be parametrized by learnable parameters, which may include, for example, weights and biases of the neural network. The learnable parameters of the deep learning model 304 may be optimized using a reinforcement learning process as described below, for training the policy 300 for batch size optimization in the production system 100. The training may be executed, for example, using known RL algorithms, such as SAC, DDPG, among others, and implemented on hardware comprising, for example, a server including a high-end processor such as a graphics processing unit (GPU), among others.

According to disclosed embodiments, the training process may be implemented on a simulation environment, using a simulation model of the production system 100 including the shop floor, inventory, etc. Thus, the "system state" in the training process may refer to a simulated system state. The trained (and tested) policy 300 may be subsequently deployed to a runtime system that can include a manufacturing planning system.

Referring to FIG. 3, the training process may be executed over a sequence of steps in an infinite horizon MDP. At each step, a system state 302 may be generated based on observations acquired by reading a system state from the simulation environment. The system state 302 may comprise a vectorized representation of the shop floor status, inventory status and a product demand of the product types. To begin the training process, the simulation environment may be initialized to return an initial observation.

The system state 302 may be provided as an input to the deep learning model 304. The deep learning model 304 may use the learnable parameters to compute logits 306, which may include logits 306a for a categorical distribution of predicted product types and logits 306b for a categorical distribution of predicted batch sizes. The logits 306a may define a vector having a dimensionality m equal to the total number of product types and the logits 306b may define a vector having a dimensionality n equal to the total number of possible batch sizes. For the purpose of illustration, a categorical distribution of 3 product types and of 7 possible batch sizes (i.e., 1, 2, 3, 4, 5, 6, 7) are shown in FIG. 3. However, it will be understood that the disclosed methodology can be scaled to a large number of product types with large batch sizes.

The term "logits" as used in this description, generally refers to a prediction or output of the deep learning model, such as defined by a final or output layer of a neural network. The logits may define a vector having a dimensionality as described above. According to the example embodiment disclosed herein, the logits 306a and 306b may respectively define unnormalized log probability vectors.

The logits 306 generated by the deep learning model 304 based on the system state 302 may be processed using the disclosed reparameterization methodology to output a control 320 action defining an integer batch size of a selected product type. According to the disclosed embodiment, the logits 306a and 306b may be respectively processed via a straight-through estimator 312 to create, respectively, a discretized vector representation 314*a* of the predicted product types and a discretized vector representation 314*b* of the predicted batch sizes. A "straight-through estimator" refers to a computational unit that can use a non-differentiable threshold function in a forward pass, and replace the non-differentiable function with a differentiable function in a backward pass or backpropagation (in this case, to compute a policy gradient). The discretized vector representation 314*a* of the predicted product types may represent the encoding of the selected product type. The discretized vector representation 314*b* of the predicted batch sizes may be reduced to an integer batch size 318 using a linear transformer 316. The control action 320 may be derived from the discretized vector representation 314*a* of the predicted product types and the integer batch size 318 as described below.

Continuing with reference to FIG. 3, the logits 306*a*, 306*b* from the deep learning model 304 may first be reparametrized by a computational unit 308 that involves perturbation of the respective logits 306*a*, 306*b* using a random noise and introducing a relaxation to create biased samples 310. The biased samples 310 may include biased samples 310*a* corresponding to the predicted product types and biased samples 310*b* corresponding to the predicted batch sizes. The biased samples 310*a*, 310*b* may represent differentiable approximations of samples of the respective categorical distributions of the predicted product types and predicted batch sizes. According to disclosed embodiments, the computational unit 308 may be implemented using a Gumbel-Softmax estimator, that can add random noise from a Gumbel distribution and use a Softmax function to provide differentiability by introducing a relaxation.

The biased samples 310*a*, 310*b* of each categorical distribution (namely, predicted product types and predicted batch sizes) created using the Gumbel-Softmax estimator may be represented by a respective vector $D_{GS}$, whose dimensionality may be equal to the respective logits 306*a*, 306*b*. The vector $D_{GS}$ may be determined as:

$$D_{GS}[i] = Softmax\,(logit_\theta + g)_i \qquad (6)$$

In equation (6), $D_{GS}[i]$ is the $i^{th}$ sample of the vector $D_{GS}$, $logit_\theta$ are the logits (in this case, an unnormalized log probability vector) of the respective categorical distribution computed using the learnable parameters $\theta$, and g is an i.i.d. random sample vector from a Gumbel (0,1) distribution.

While the biased samples 310*a*, 310*b* may be differentiable, they may not be identical to the samples from the corresponding categorical distribution. The straight-through estimator 312 can address this issue by creating respective discretized vector representations 314*a*, 314*b* (e.g., one-hot vector encodings) of the categorical samples by correcting the bias in the forward pass, and using the differentiable biased samples 310*a*, 310*b* in the backward pass. In the context of the disclosed embodiment, the straight-through estimator may include a straight-through Gumbel-Softmax (STGS) estimator. According to disclosed embodiments, the STGS estimator 312 may correct the bias in the forward pass by introducing a constant shift of $D_{GS}$, as given by:

$$D_{STGS} = D_{hot} - [D_{GS}]_{const} + D_{GS} \qquad (7)$$

where $D_{hot}$ is a one-hot vector encoding 314*a*, 314*b* of the biased samples 310*a*, 310*b* of the respective categorical distribution (predicted product types and predicted batch sizes), given by:

$$D_{hot} = one\_hot\!\left(\arg\max_i\,(logit_\theta + g)_i\right) \qquad (8)$$

In equation (7), $[D_{GS}]_{const}$ treats $D_{GS}$ as a constant by detaching dependency on 0 during backpropagation (backward pass) of the neural network. Thus, in the backward pass, both $D_{hot}$ and $[D_{GS}]_{const}$ are constants for which the derivatives with respect to the learnable parameters $\theta$ is zero. In this manner, $D_{STGS}$ is computed as a respective one-hot vector 314*a*, 314*b* in the forward pass and a differentiable approximation 310*a*, 310*b* in the backward pass of the neural network. In FIG. 3, the information flow during backpropagation is illustrated by dashed arrows.

The learnable parameters $\theta$ may be updated by computing a policy loss based on the control action. The policy loss may be determined dependent on evaluation of a reward function (e.g., using equation (1) or (2)). The learnable parameters $\theta$ may be updated by computing a gradient of the policy loss. Using the STGS estimator 312, the policy loss may be defined by a differentiable objective function $f$, where the policy gradient may be computed by estimating the gradient under $D_{STGS}$ as:

$$\nabla_\theta f(D_{STGS}) = \left[\frac{\partial f(D_{STGS})}{\partial \theta_j}\right]_j \qquad (9)$$

In equation (9), $\theta_j$ denotes the $j^{th}$ element of the learnable parameters $\theta$.

The above-described STGS estimator 312 may provide lower variance, prevent error in the forward pass and maintain sparsity. Although the STGS estimator 312 can provide a good reparameterization for discrete random variables, directly using the discretized vector representation 314*b* from the STGS estimator 312 to represent integer batch sizes may result in high dimensionality, particularly in case of a large-scale production system.

Integer decision variables usually appear in industrial settings, such as in production systems, that involve many integer-only actions. Despite the discreteness, integer variables share one thing in common with continuous variables, namely comparability, or more mathematically, the ability to form a totally ordered set. This is the key that makes integer variables distinct from discrete counterparts, which allows integer variables to be treated like continuous instead of discrete/categorical variables. The proposed integer reparameterization is based on the insight that, since integer actions (e.g., batch sizes) do not necessarily require a one-hot encoding, once being generated, they may be treated like a continuous action in a subsequent computation. This can greatly reduce the computational overhead and can be a key in adapting continuous action-based RL algorithms, such as SAC and DDPG, for integer actions.

According to disclosed embodiments, the policy 300 may further include a computational unit 316 that applies a linear transformation to reduce the discretized vector representation (one-hot vector encoding) 314*b* of the predicted batch sizes to an integer batch size 318. Recall that the STGS estimator 312 (see equation (7)) generates a differentiable one-hot random vector $D_{STGS}$. Then arg max $D_{STGS}[i]$, the index/argument of 1 in $D_{STGS}$, is an integer random variable following the distribution formed by Softmax $(logit_\theta)$. Thereby, once establishing a differentiable mapping from $D_{STGS}$ to $$\arg\max_{i} D_{STGS}[i],$$

it is possible to nave a differentiable random integer parameterized by $\theta$. According to disclosed embodiments, such a differentiable mapping may be constructed using a linear map, as given by:

$$Ind_\theta = \langle [1, \ldots , n], D_{STGS} \rangle \qquad (10)$$

In equation (10), $\langle .,. \rangle$ denotes an inner product and $D_{STGS}$ is assumed to be n-dimensional, where n is the number of possible batch sizes. The linear transformation according to equation (10) thus results in a random integer $Ind_\theta$, parameterized by $\theta$, whose value equals $$\arg\max_{i \in [1, \ldots , n]} D_{STGS}[i].$$

Still referring to FIG. 3, according to a disclosed embodiment, the control action 320 may be determined based on a scalar multiplication of the encoding 314$a$ of the selected product type by the integer batch size 318. The encoding 314$a$ may include a m-dimensional one-hot vector (where m is the number of product types) in which a single entry is '1', while the remaining entries are '0'. The position of the '1' in the one-hot vector 314$a$ may be indicative of the selected product type. The resulting control action 320 may thus also be defined by a m-dimensional vector, where each entry is associated with a batch size of a product type. In the control action 320, one of the entries, which corresponds to the position of the selected product type, may represent the integer batch size 318, while remaining entries may be '0'. Thereby, the control action 320 may define, at each step, an integer batch size of a selected product type. The system state 302 may be updated based on the control action 320 at each step.

Figure 4:
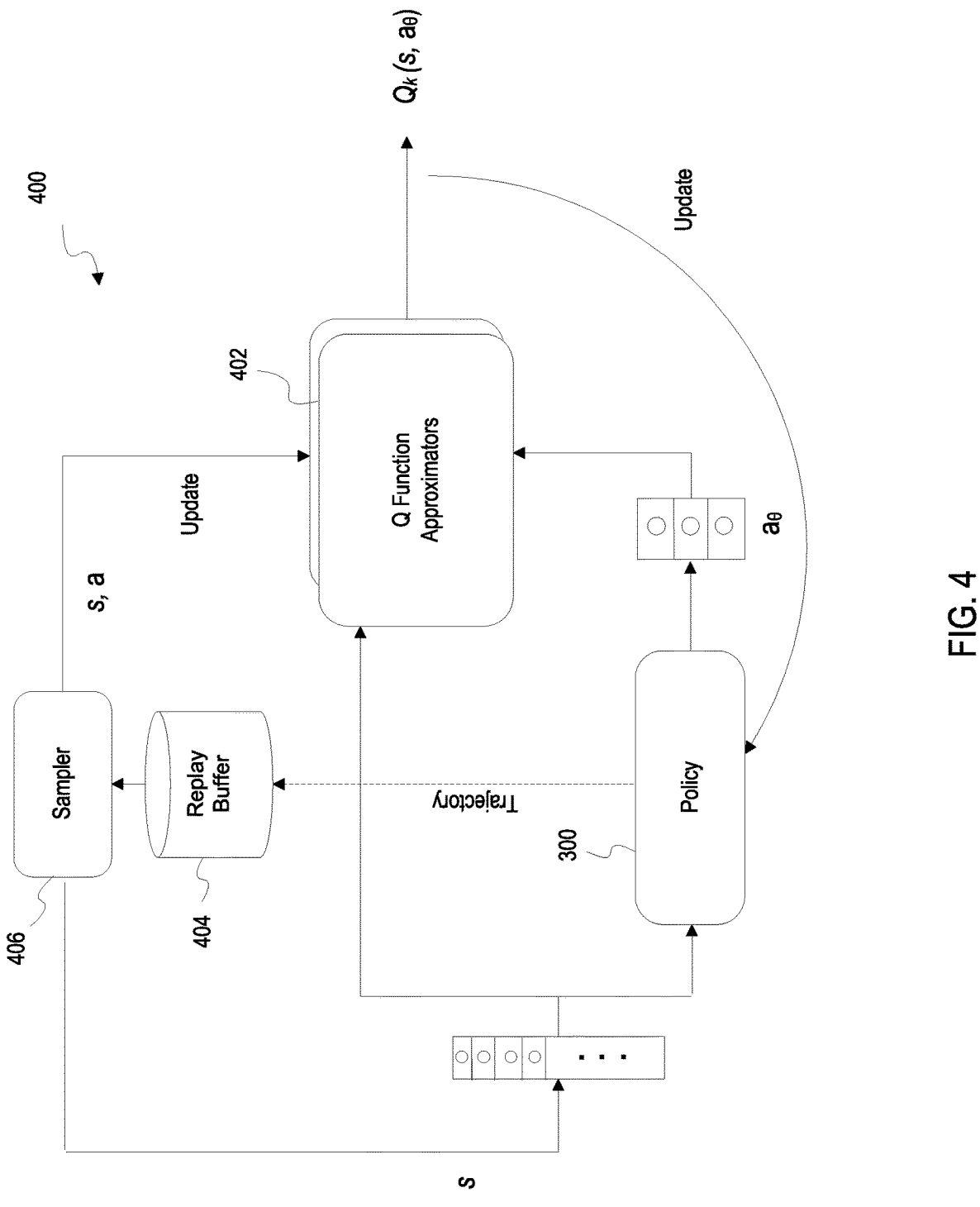
FIG. 4 is a schematic illustration of a soft actor-critic (SAC) architecture for training a RL policy according to an example embodiment.

FIG. 4 schematically illustrates a soft actor-critic (SAC) architecture 400 according to an example embodiment. SAC is a type of off-policy actor-critic method based on a replay buffer (collection of historical trajectories) that involves a policy, referred to as "actor", and one or more Q function approximators, referred to as "critics". As stated above, the Q function in the SAC method may be regularized by an entropy bonus added to the reward function. The SAC method, as currently known, is suited to continuous action-based policies. The disclosed embodiments can enable the SAC method to be applied for integer actions, making it suitable for production planning for large-scale production systems.

For a basic understanding of the SAC method, the reader is directed to the publication: Tuomas Haarnoja, Aurick Zhou, Pieter Abbeel, and Sergey Levine. Soft actor-critic: Off-policy maximum entropy deep reinforcement learning with a stochastic actor. In International conference on machine learning, pages 1861-1870. PMLR, 2018. The state-of-the-art also includes a number of variants of the above-mentioned approach.

Referring now to FIG. 4, the SAC architecture 400 may include the above-described policy 300, parameterized by $\theta$, and one or more (in this case, two) Q function approximators 402, parameterized by $\varphi_k$, $k \in [1,2]$. The policy 300 and the Q function approximators 402 may comprise separate neural networks. The method may involve using the policy $(\pi_\theta)$ 300 to generate a sequence of state actions pairs $(s_t, a_t)$ over a known horizon using the simulation environment to define a trajectory, which may be stored in a replay buffer 404. Having created the replay buffer 406, the learnable parameters of the policy 300 and the Q function approximators 402 may be updated over a sequence of update steps by sampling, at each update step, a batch of state-action transitions from the replay buffer 404.

The learnable parameters $\varphi_k$ of the Q function approximators 402 may be updated using sampled state-action pairs (s,a) by regressing to a single shared target determined based on evaluation of the reward function (e.g., using equation (1) or (2)), for example via minimization of a mean-squared Bellman error (MSBE) loss function, as known in the art.

The learnable parameters $\theta$ of the policy 300 may be updated in the following manner. The policy 300 may receive, as input, a sampled system state s, and use its learnable parameters $\theta$ to output a control action $a_\theta$ defining an integer batch size of a selected product type. Each Q function approximator 402 may receive, as input the sampled system state s and the control action $a_\theta$ and use its learnable parameters $\varphi_k$ to respectively determine a scalar $Q_k$ $(s,a_\theta)$. The learnable parameters $\theta$ of the policy 300 may be updated based on minimization of a policy loss, which may be defined as a function of $$\min_{k \in [1,2]} Q_k(s, a_\theta)$$

averaged over un watch, for example, as a negative of the averaged $$\min_{k \in [1,2]} Q_k(s, a_\theta).$$

The policy loss may be minimized by backpropagating the differentiable approximation $D_{STGS}$ for $a_\theta$ to estimate a gradient of the policy loss at each step, for example, using equation (9).

As described above, dimension of the control action $a_\theta$ may be precisely equal to the number of action variables (i.e., product types). Thereby, the input/output dimension of the policy 300 and the Q function approximators 402 can be the same as their continuous action counterparts. The only difference may lie in the policy design, where the output is restricted to have an integer structure as described above, while the continuous action version does not have such a restriction.

Subsequent to the training process, the policy 300 may be deployed to a runtime system (e.g., a manufacturing planning system) as an RL policy 112, as shown in FIG. 1. Referring again to FIG. 1, the policy 112 may process a system state 120 to output a control action 122 comprising an integer batch size of a selected product type. The control action 122 may be determined in the following way. First, the RL policy 112 may use the learned parameters of its deep learning model to compute logits for a categorical distribution of predicted product types and a categorical distribution of predicted batch sizes from the system state. The RL policy 112 may then process the logits to transform the categorical distribution of predicted product types into an encoding of selected product type and reduce the categorical distribution of predicted batch sizes into an integer batch size.

Consistent with disclosed embodiments, the logits from the deep learning model may be processed to determine respective discretized vector representations of the predicted product types and the predicted batch sizes. As described above, the discretized vector representations may be created by perturbing the logits with a random noise to create biased samples of the respective categorical distributions (e.g., using a Gumbel-Softmax estimator as defined in equation (6)), and computing a one-hot vector encoding of the biased samples of the respective categorical distributions (e.g., using equation (8)). The one-hot vector encoding of the predicted product types may define the encoding of the selected product type. The one-hot vector encoding of the predicted batch sizes may be processed using a linear transformation (e.g., using equation (10)) to output an integer batch size. The control action 122 may be determined based on a scalar multiplication of the encoding of the selected product type by the integer batch size. By executing the RL policy 112 in a sequence of steps, a sequence of batches of different product types with corresponding bath sizes may be determined, to support execution of batch processing by the production system 100.

Figure 5:
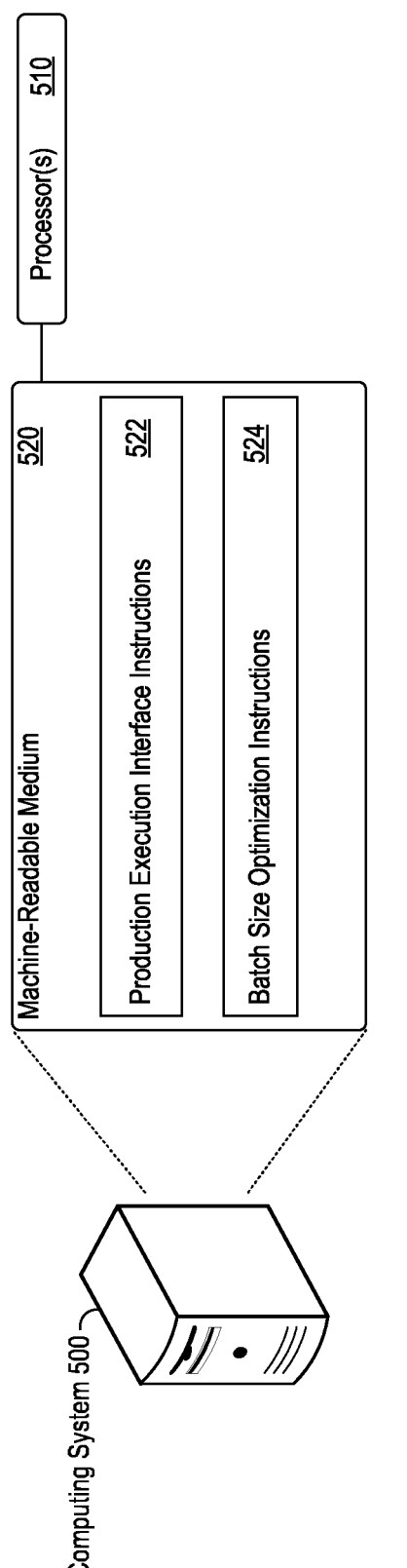
FIG. 5 illustrates a computing system that can support execution of batch production by a production system according to disclosed embodiments.

FIG. 5 shows an example of a computing system 500 that can support execution of batch production by a production system according to disclosed embodiments. The computing system 500 includes at least one processor 510, which may take the form of a single or multiple processors. The processor(s) 510 may include a one or more CPUs, GPUs, microprocessors, or any hardware devices suitable for executing instructions stored on a memory comprising a machine-readable medium. The computing system 500 further includes a machine-readable medium 520. The machine-readable medium 520 may take the form of any non-transitory electronic, magnetic, optical, or other physical storage device that stores executable instructions, such as production execution interface instructions 522 and batch size optimization instructions 524, as shown in FIG. 5. As such, the machine-readable medium 520 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The computing system 500 may execute instructions stored on the machine-readable medium 520 through the processor(s) 510. Executing the instructions (e.g., the production execution interface instructions 522 and the batch size optimization instructions 524) may cause the computing system 500 to perform any of the technical features described herein, including any of the features of the production execution interface module 108 and the batch size optimization module 110 described above.

The systems, methods, devices, and logic described above, including the production execution interface module 108 and the batch size optimization module 110, may be implemented in many different ways in many different combinations of hardware, logic, circuitry, and executable instructions stored on a machine-readable medium. For example, these modules may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine-readable instructions stored on the medium, which when executed in an endpoint, computer system, or other device, cause the device to perform operations according to any of the description above, including according to any features of the production execution interface module 108 and the batch size optimization module 110. Computer readable program instructions described herein can be downloaded to respective computing/processing devices from a computer readable storage medium or to an external computer or external storage device via a network, for example, the Internet, a local area network, a wide area network and/or a wireless network.

The processing capability of the systems, devices, and modules described herein, including the production execution interface module 108 and the batch size optimization module 110, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

Although this disclosure has been described with reference to particular embodiments, it is to be understood that the embodiments and variations shown and described herein are for illustration purposes only. Modifications to the current design may be implemented by those skilled in the art, without departing from the scope of the patent claims.

What is claimed is:

1. A computer-implemented method for supporting execution of batch production by a production system comprising production machines configured to produce a number of different product types on a shop floor, the method comprising:

over a sequence of steps, iteratively performing:

acquiring a system state defined by a shop floor status, inventory status and a product demand of the product types, processing the system state using a reinforcement learned policy comprising a deep learning model to output a control action defining an integer batch size of a selected product type, wherein the control action is determined by:

using learned parameters of the deep learning model to compute logits for a categorical distribution of predicted product types and a categorical distribution of predicted batch sizes from the system state, and processing the logits to transform the categorical distribution of predicted product types into an encoding of the selected product type and reduce the categorical distribution of predicted batch sizes into an integer batch size, and communicating the control action to the production machines to effect production of a next batch on the shop floor based on the integer batch size of the selected product type.

2. The method according to claim 1, wherein the shop floor status defines a utilization of resources on the shop floor by one or more current batches in production, which is indicative of a remaining production time of the one or more current batches.

3. The method according to claim 1, wherein the policy is trained in a reinforcement learning process that comprises, over a sequence of steps, optimizing learnable parameters of the policy to maximize a cumulative reward resulting from a sequence of control actions, based on a reward function defined based on a total production cost.

4. The method according to claim 3, wherein the total production cost includes cost of raw materials, cost of secondary resources and cost of obsolescence of products in inventory.

5. The method according to claim 1, wherein the processing of the logits comprises:

creating respective discretized vector representations of the predicted product types and the predicted batch sizes based on the respective logits, wherein the discretized vector representation of the predicted product types defines the encoding of selected product type, and determining the integer batch size from the discretized vector representation of the predicted batch sizes using a linear transformation.

6. The method according to claim 5, wherein the respective discretized vector representations are created by:

perturbing the logits for the categorical distributions of the predicted product types and the predicted batch sizes with random noise to create biased samples that represent differentiable approximations of samples of the respective categorical distributions, and computing a first one-hot vector encoding of the biased samples corresponding to the predicted product types and a second one-hot vector encoding of the biased samples corresponding to the predicted batch sizes, wherein the first one-hot vector encoding defines the encoding of the selected product type.

7. The method according to claim 6, wherein the biased samples are created using a Gumbel-Softmax estimator.

8. The method according to claim 6, wherein the linear transformation comprises an inner product of the second one-hot vector encoding and the vector $[1, \ldots n]$, where n denotes a dimensionality of the second one-hot vector encoding defined by the number of possible batch sizes.

9. The method according to claim 1, wherein the control action is determined based on a scalar multiplication of the encoding of the selected product type by the integer batch size.

10. A computing system for supporting execution of batch production by a production system comprising production machines configured to produce a number of different product types on a shop floor, the system comprising:

one or more processors, and memory storing algorithmic modules executable by the one or more processors, the algorithmic modules comprising:

a production execution interface module configured to acquire a system state defined by a shop floor status, inventory status and a product demand of the product types, and a batch size optimization module configured to process the system state using a reinforcement learned policy comprising a deep learning model to output a control action defining an integer batch size of a selected product type, wherein the control action is determined by:

using learned parameters of the deep learning model to compute logits for a categorical distribution of predicted product types and a categorical distribution of predicted batch sizes from the system state, and processing the logits to transform the categorical distribution of predicted product types into an encoding of the selected product type and reduce the categorical distribution of predicted batch sizes into an integer batch size, wherein the production execution interface module is configured to communicate the control action to the production system-machines to effect production of a next batch on the shop floor based on the integer batch size of the selected product type, and wherein the algorithmic modules are iteratively executable over a sequence of steps to support batch production by the production system.

* * * * *